(12) United States Patent
Li et al.

(10) Patent No.: US 8,987,960 B2
(45) Date of Patent: Mar. 24, 2015

(54) SUPPORTING AND HEAT DISSIPATING STRUCTURE FOR MOTOR HAVING INTEGRATED DRIVER

(75) Inventors: Chih-Yung Li, Tsao Tun Chen (TW); Chiu-Yao Lin, Tsao Tun Chen (TW); Hua-Yi Hung, Tsao Tun Chen (TW)

(73) Assignee: Headline Electric Co., Ltd., Nan Tou Hsien (TW)

( * ) Notice: Subject to any disclaimer, the term of this patent is extended or adjusted under 35 U.S.C. 154(b) by 276 days.

(21) Appl. No.: 13/596,055

(22) Filed: Aug. 28, 2012

(65) Prior Publication Data

US 2014/0062268 A1    Mar. 6, 2014

(51) Int. Cl.
*H02K 5/26* (2006.01)
*H02K 5/00* (2006.01)

(52) U.S. Cl.
CPC ... *H02K 5/26* (2013.01); *H02K 5/00* (2013.01)
USPC .......................................... 310/91; 310/68 R

(58) Field of Classification Search
CPC .................................. H02K 5/00; H02K 5/26
USPC ............................................ 310/68 R, 91, 90
See application file for complete search history.

(56) References Cited

U.S. PATENT DOCUMENTS

| | | | |
|---|---|---|---|
| 3,750,267 A * | 8/1973 | Otto | 29/507 |
| 5,436,519 A * | 7/1995 | Takahashi et al. | 310/216.114 |
| 5,939,807 A * | 8/1999 | Patyk et al. | 310/89 |
| 2002/0167238 A1* | 11/2002 | Kogure et al. | 310/89 |
| 2011/0291500 A1* | 12/2011 | Tang et al. | 310/64 |
| 2011/0298321 A1* | 12/2011 | Tang et al. | 310/71 |

* cited by examiner

*Primary Examiner* — Terrance Kenerly
(74) *Attorney, Agent, or Firm* — Leong C. Lei

(57) ABSTRACT

The present disclosure provides a supporting and heat dissipating structure. A driver is arranged on an inner surface of a heat sink. The heat sink has protrusions for heat dissipation. An axle hole and a fixing ring are formed at the center of the heat sink. An elastic ring is arranged around the fixing ring for connecting with a supporting frame. A tubular barrel is used for connecting the heat sink to a motor. A structure for easily and firmly supporting the motor and the driver can be obtained. The structure can also absorb vibration while the motor rotating.

4 Claims, 4 Drawing Sheets

SUPPORTING AND HEAT DISSIPATING STRUCTURE FOR MOTOR HAVING INTEGRATED DRIVER

BACKGROUND OF THE DISCLOSURE

Field of the Disclosure

A conventional motor is usually connected by a motor driver through an additional electric wire for driving the motor to work. Since the motor driver generates a lot of heat while operating, it is usually arranged away from the motor to avoid affecting the rotating speed of the motor. However, such an arrangement is not easy to utilize and occupies a relatively large space. Manufacturers all attempt to develop a structure for connecting the driver to the motor. Since large amount of heat generated by the driver is hard to overcome, the structures nowadays are still split-types. Therefore, how to effectively integrate the driver into the motor and overcome the mentioned heat problem is a major objective in this industry.

In order to solve the above problem, a Taiwan patent No. M406887 discloses a driver device for brushless motor, which is arranged at a bottom portion of a supporting frame. That can decrease the space needed of the whole structure. However, a hanging type structure is unable to meet the mentioned arrangement, and has to be arranged by attaching design. Thus, the disclosure can not meet all kinds of applications.

In order to meet the requirements of all kinds of applications, a Taiwan patent No. I335124 discloses a motor structure having a back-connected driver. The motor structure has a built-in centrifugal fan which rotates synchronously with the motor for dissipating heat. An inlet hole and an outlet hole are formed on a housing of the driver for heat convection purpose. The heat generated from the driver can be dissipated by air flow generated by the fan. Although the heat dissipating effect is improved, however, the motor can only output from one end of the motor axle. Since more and more applications adopt the two ends of the motor axle for output use, the combination of the motor and the driver has to be further improved to meet the requirement that the motor and the driver is well integrated and can be safely operated. Besides, it also has to satisfy the applications adopting two ends of the motor axle for output use. Therefore, the mentioned motor structures have needs for further improvement.

SUMMARY OF THE DISCLOSURE

The inventor is a professional motor manufacturer, who made this invention through fully consideration based on the above mentioned cases in which the manufacture is simplified, the dimensions thereof is downsized and the safety for use is improved. In order to keep continuously improving and meet requirements of the industry, the manufacturer develops this supporting and heat dissipating structure for a motor device having an integrated driver. A metal heat sink is provided for mounting the driver device. The metal heat sink has a plurality of fins extending from therefrom for further improving heat dissipation. A fixing ring extending from an axle hole of the metal heat sink is used for supporting the motor device and dissipating heat. That structure indeed improves the safety and the heat dissipation of integration of the driver to the motor.

The main objective of the present disclosure is to provide a supporting and heat dissipating structure, in which a driver is arranged on an inner surface of a heat sink. The heat sink has protrusions for heat dissipation. An axle hole and a fixing ring are formed at the center of the heat sink. An elastic ring is arranged around the fixing ring for connecting with a supporting frame. A tubular barrel is used for connecting the heat sink to a motor. A structure for easily and firmly supporting the motor and the driver can be obtained. The structure can also absorb vibration while the motor rotating.

Another objective of present disclosure aims to provide a heat sink with an axle hole formed at the center thereof for the motor outputting from both sides of the motor.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure.

DETAILED DESCRIPTION OF THE INVENTION

The detail of the present disclosure is described below by presenting embodiments with accompanying drawings. It should be understood that the scope of the present disclosure is not limited by the embodiments.

Figure 1:
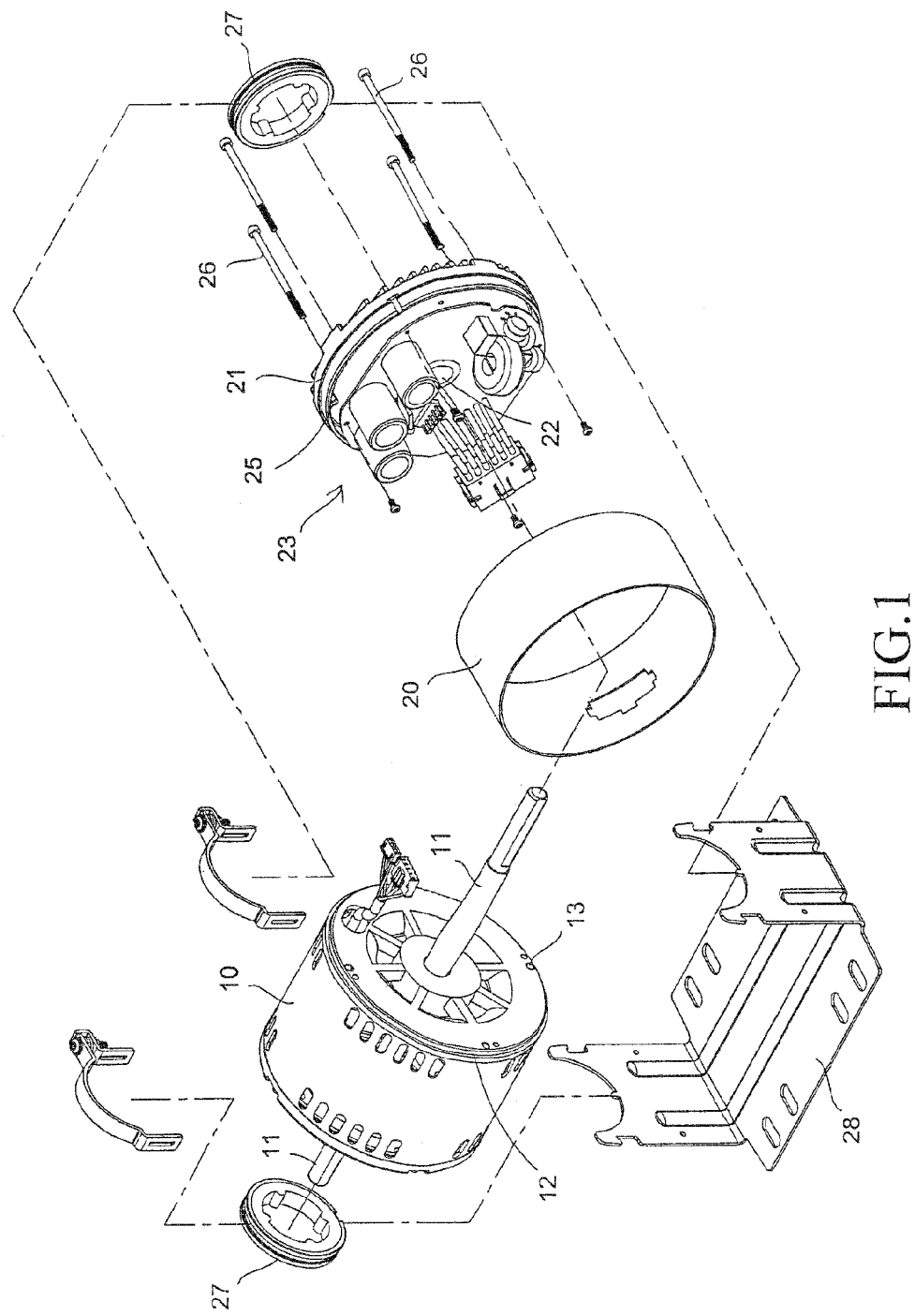
FIG. 1 is an exploded view according to an embodiment of the present disclosure.
Figure 2:
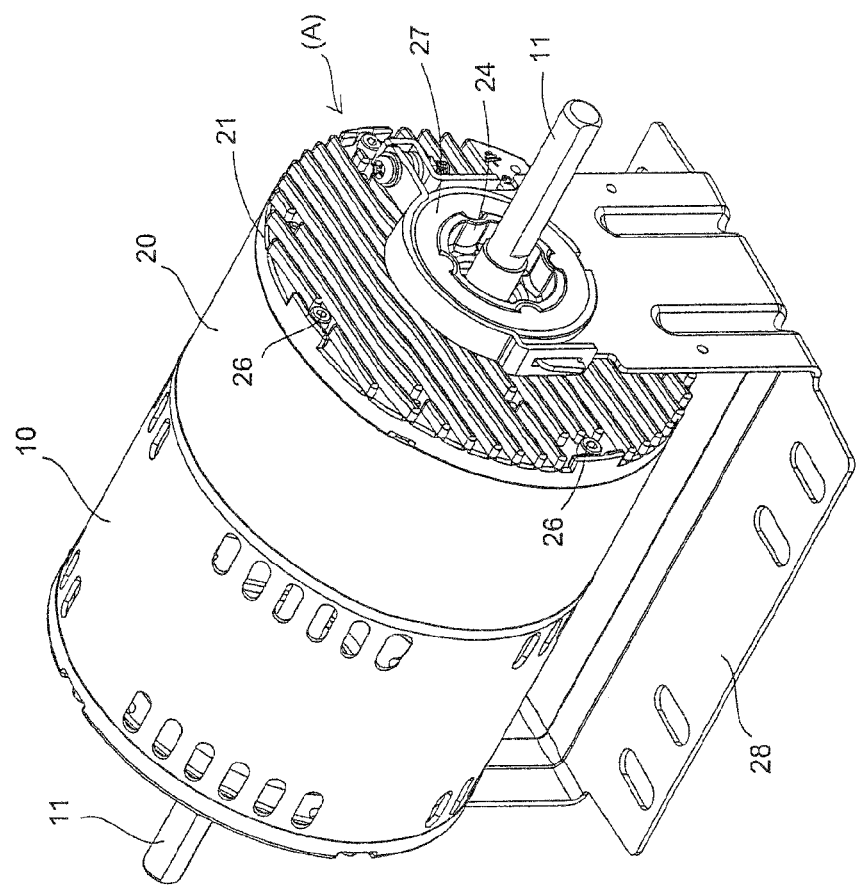
FIG. 2 is a perspective view according to the embodiment of the present disclosure.

FIG. 1 and FIG. 2 show a supporting and heat dissipating structure for a motor device having an integrated driver according to an embodiment of the present disclosure. The structure includes a motor 10 and an axle 11 arranged at its center. The axle 11 protrudes out of the motor 10 from one side or both sides thereof. A connecting ring 12 arranged at the peripheral of an end plate of the motor 10. The connecting ring 12 has a stepping shaped cross section. Besides, there are a plurality of screw holes 13 formed on the end plate for fixing screws. A tubular barrel 20 correspondingly connected to the connecting ring 12 on the end of the motor 10. The tubular barrel 20 has predetermined length. A space is formed between the tubular barrel 20 and the motor 10. A plurality of openings are formed on the tubular barrel 20 for air venting. A heat sink 21 is connected to another end of the tubular barrel 20. The heat sink 21 has an outer surface formed with a plurality of protrusions (A) for providing more heat dissipating surface. An axle hole 22 is formed at the center of the heat sink 21 for inserting the axle 11 of the motor 10.

The heat sink 21 has an inner surface for mounting the integrated driver 23. Appropriate glue is applied onto the driver 23 for encapsulation and water proof purposes. A fixing ring 24 extends from the outer surface of the heat sink 21 and around the axle hole 22. The fixing ring 24 provides protection to the axle hole 22. Besides, a plurality of holes 25 corresponding to the screw holes 13 of the end plate are formed around the peripheral of the heat sink 21 for passing through a plurality of bolts for fastening the heat sink 21 to the motor 10. Thus the driver 23 is integrated on the motor 10. An elastic ring 27 is fixed around the fixing ring 24. And a supporting frame 28 is provided for holding the elastic ring 27. Consequently, the motor 10 and the driver 23 are together supported by the supporting frame 28. The vibration can be eliminated while the motor 10 rotating by the elastic ring 27.

Figure 3:
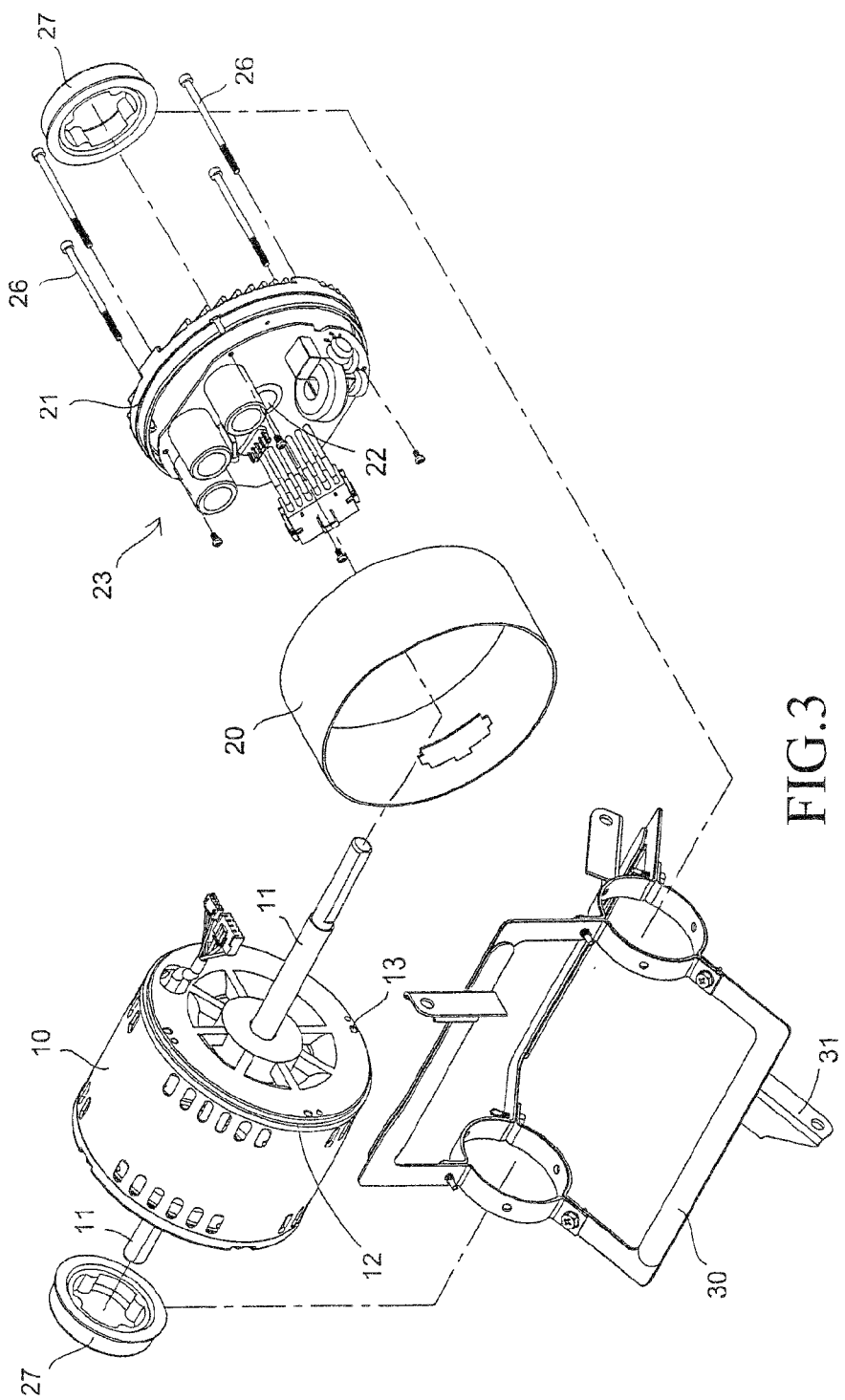
FIG. 3 is an exploded view according to another embodiment of the present disclosure.
Figure 4:
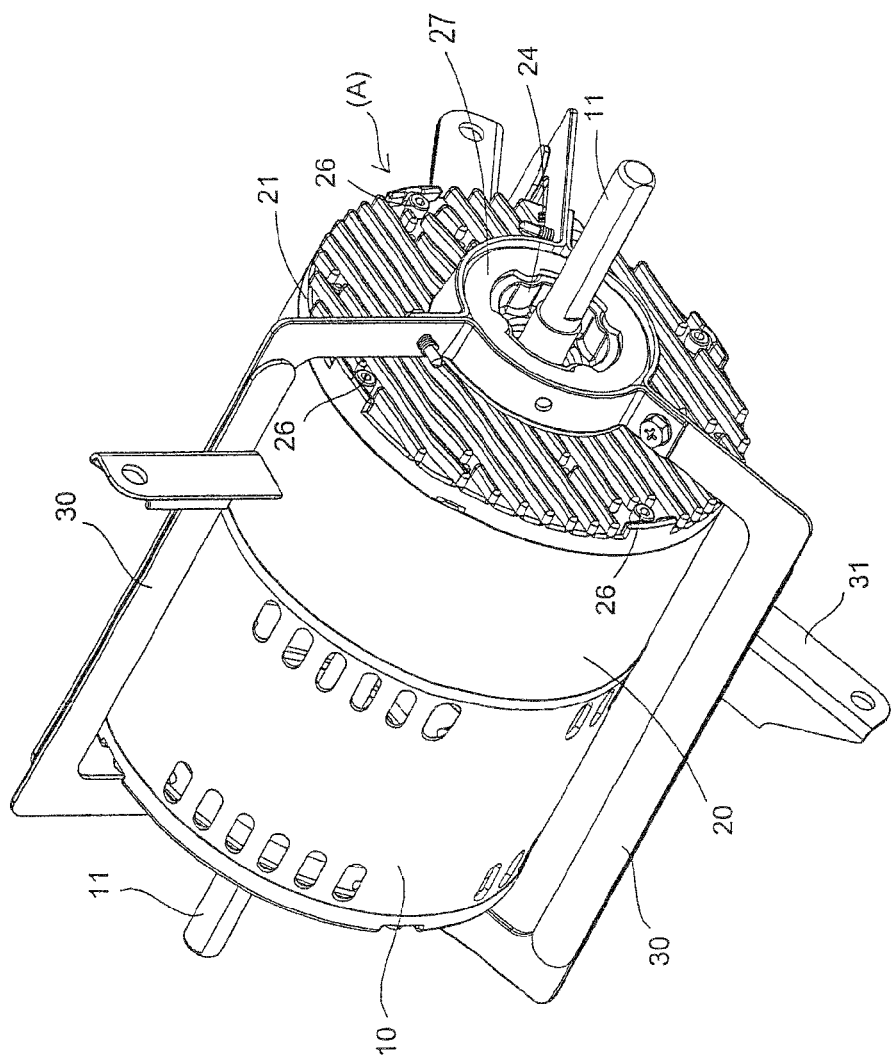
FIG. 4 is a perspective view according to the embodiment in FIG. 3.

FIG. 3 and FIG. 4 show another supporting frame 28 according to another embodiment. The supporting frame 28 has three parts of arms 30 surrounding the motor 10 at equal intervals and connected to each other. And three legs 31 are respectively connected to the arms 30. Two elastic rings 27 are arranged around two fixing rings 24 extending from two sides of the motor 10. The motor 10 and the driver 23 are together supported by the supporting frame 28. And the vibration can be eliminated while the motor 10 rotating by the elastic rings 27.

The primary improvement of the disclosure is described below. The connecting ring 12 is arranged at an end of the motor 10. The tubular barrel 20 is connected to the connecting ring 12 and is formed of a closed loop shape from a metal plate. The heat sink 21 is connected to the tubular barrel 20. The heat sink 21 includes an inner surface for mounting the integrated driver 23, an outer surface formed with a plurality of protrusions and an axle hole 22 formed at the center thereof. The fixing ring 24 extends from the outer surface and around the axle hole 22. The elastic ring 27 is fixed around the fixing ring 24. The supporting frame 28 is used for holding the elastic ring 27. Then the objective of the disclosure is achieved.

The heat sink 21 having the protrusions (A) improves the heat dissipation. The axle hole 22 at the center of the heat sink 21 allows the motor 10 outputting from one side or both sides thereof. The driver 23 can be easily integrated on the motor without any assembling problem.

In conclusion, the supporting and heat dissipating structure of the present disclosure arranges the driver on the inner surface of the heat sink, which has protrusions for heat dissipation. The axle hole and the fixing ring are formed at the center of the heat sink. The tubular barrel is used for connecting the heat sink to the motor. A structure for easily and firmly supporting the motor and the driver can be obtained, which is simplified and easy to use.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. A supporting and heat dissipating structure for a motor device having an integrated driver, the motor device including a motor and an output axle and a driver component for driving the motor to rotate, the supporting and heat dissipating structure comprising:
    a connecting ring arranged at an end of the motor;
    a tubular barrel connected to the connecting ring and formed of a closed loop shape from a metal plate;
    a heat sink connected to the tubular barrel and having an inner surface for mounting the integrated driver, an outer surface formed with a plurality of protrusions, and an axle hole formed at the center thereof;
    a fixing ring extending from the outer surface and around the axle hole;
    an elastic ring fixed around the fixing ring; and
    a supporting frame for holding the elastic ring;
    wherein the heat sink is connected through the tubular barrel to the end of the motor so that the heat sink is opposite to and spaced from the motor by the tubular barrel and wherein the heat sink comprises glue applied to the integrated driver mounted thereto for encapsulation of the integrated driver and for water protection of the integrated driver.

2. The structure as claim 1, wherein the hole is configured for passing through the output axle of the motor device which outputs rotation from one or two ends thereof.

3. The structure as claim 1, wherein a plurality of holes are formed around the peripheral of the heat sink for passing through a plurality of bolts for fastening the heat sink to the motor.

4. The structure as claim 1, wherein the supporting frame has three arms surrounding the motor at equal intervals and connected to each other, and three legs respectively connected to the arms.

* * * * *